United States Patent [19]

Maeda et al.

[11] Patent Number: 4,669,279
[45] Date of Patent: Jun. 2, 1987

[54] MOTOR COOLING APPARATUS FOR REFRIGERATOR

[75] Inventors: Kensaku Maeda; Satoru Fujiwara, both of Yokohama; Teiichi Mochizuki, Fujisawa; Yutaka Nagashima, Machida, all of Japan

[73] Assignee: Ebara Corporation, Tokyo, Japan

[21] Appl. No.: 794,790

[22] Filed: Nov. 4, 1985

[30] Foreign Application Priority Data

Mar. 19, 1985 [JP] Japan ............................. 60-38300[U]
Mar. 19, 1985 [JP] Japan ............................. 60-38301[U]
Mar. 19, 1985 [JP] Japan ............................. 60-38302[U]

[51] Int. Cl.⁴ ............................................. F25B 31/00
[52] U.S. Cl. ..................................... 62/505; 310/54; 310/64
[58] Field of Search ................. 62/505; 310/52, 54, 310/64

[56] References Cited

U.S. PATENT DOCUMENTS

| | | | |
|---|---|---|---|
| 3,112,618 | 12/1963 | Weller | 62/505 |
| 3,158,009 | 11/1964 | Rayner | 62/505 |
| 3,165,905 | 1/1965 | Ware | 62/219 |
| 3,241,331 | 3/1966 | Endress et al. | 62/117 |
| 3,416,330 | 12/1968 | Weller et al. | 62/505 |
| 3,805,547 | 4/1974 | Eber | 62/505 |
| 3,838,581 | 10/1974 | Endress | 62/505 |
| 3,866,438 | 2/1975 | Endress | 62/505 |

FOREIGN PATENT DOCUMENTS 58-110963 7/1983 Japan .

*Primary Examiner*—Ronald C. Capossela
*Attorney, Agent, or Firm*—Oblon, Fisher, Spivak, McClelland & Maier

[57] ABSTRACT

A motor cooling apparatus for use with the refrigerator which includes an evaporator, a condenser, a compressor and a main motor adapted to actuate the compressor and connected to the condenser at the internal space thereof. The motor cooling apparatus includes a refrigerant liquid guide passage for guiding refrigerant liquid condensed in the condenser to the internal space of the main motor by means of a refrigerant pump; a first opening formed in the condenser and connected to the internal space of the main motor; and a second opening formed at the bottom of the condenser and connected to the evaporator. The condenser has a reservoir at the bottom thereof to stock the refrigerant liquid. The reservoir is located between the first and second openings in the longitudinal direction of the condenser and connected to the refrigerant liquid guide passage on the suction side of the refrigerant pump. The reservoir may be formed at the same position as where the second opening is formed. The reservoir is provided in this case with a throttle device at the bottom thereof to control the amount of the refrigerant liquid flowing from the condenser to the evaporator. A dam is further formed in the reservoir, enclosing the throttle device, to prevent the refrigerant liquid which has flowed into the reservoir from flowing directly to the throttle device.

7 Claims, 4 Drawing Figures

MOTOR COOLING APPARATUS FOR REFRIGERATOR

BACKGROUND OF THE INVENTION

1. Field of the Invention

The present invention relates to a motor cooling apparatus for a refrigerator and, more particularly, it relates to an apparatus for cooling the main motor in the refrigerator, the refrigerator further including an evaporator, a condenser and a compressor, and the main motor serving to actuate the compressor.

2. Related Art

A conventionally-proposed typical motor cooling apparatus for the refrigerator which includes the evaporator, condenser, compressor and main motor for actuating the compressor is disclosed in Laid-open Japanese Pat. Publication No. 110963/1983. Such conventional motor cooling apparatus as taught in the publication is constructed in such a manner that the internal space of the main motor is connected to the condenser and that a guide passage is provided to introduce or guide refrigerant liquid condensed in the condenser to the internal space of the main motor by means of a refrigerant pump to cool the motor.

The conventional motor cooling apparatus constructed according to the above-described manner has an advantage that the refrigerator can save significant energy because the motor is cooled by discharging heat produced inside the motor directly to cooling water in the condenser without using the compression power of the refrigerator.

The latent heat of vaporization of the refrigerant liquid is used to eliminate the heat produced inside the motor in the case of the abovementioned motor cooling apparatus. According to the study of the inventors of the present invention, however, it has been found that a flow amount of refrigerant liquid larger than that calculated on the assumption that all of the refrigerant supplied evaporates is needed to smoothly remove the heat inside the motor and achieve a uniform cooling effect. Particularly, the suction pipe position of the refrigerant liquid supply pump at which the suction pipe is connected to the condenser is not appropriate and when the refrigerator is operated under small load, the amount of refrigerant liquid sufficient to meet the suction capacity of the pump is not obtained to cause cavitation. As a result, the amount of refrigerant liquid which is to be supplied to the motor becomes largely insufficient, and the motor temperature rises accordingly.

In the case of this motor cooling apparatus, a part of the refrigerant liquid which has been supplied to the motor evaporates at the time of its cooling the motor and is again condensed to refrigerant liquid by the condenser. The remainder of the refrigerant liquid is left not evaporated in the motor is returned to the condenser to join the refrigerant liquid in the condenser. The refrigerant liquid thus joined is sucked into the pump through a pipe-connected opening in the bottom of the condenser to form a cycle through which it is fed to the motor. On the other hand, refrigerant gas discharged from the compressor is also condensed in the condenser and this condensed refrigerant liquid flows through a passage in the bottom of the condenser, which is connected to the evaporator, and a throttle mechanism such as the orifice into the evaporator.

As described above, both of the refrigerant liquid circulated to cool the motor and the one circulated through the refrigerating cycle are joined each other and again divided in the condenser. When the refrigerator is operated under small load, therefore, the amount of the refrigerant gas discharged from the compressor decreases and the amount of the refrigerant liquid produced when the refrigerant gas is condensed also decreases. On the other hand, the amount of the refrigerant liquid circulated through the motor cooling cycle is almost changed because it is circulated by the pump. However, the refrigerant liquid flowing out of the condenser has been joined and then divided on the bottom of the condenser, whichever cycle it may be circulated through. When the pipe connection opening or port to the pump is not appropriately located, the amount of the refrigerant liquid sucked into the pump to cool the motor is not balanced with the amount of the refrigerant liquid flowing to the evaporator, thereby allowing a part of the refrigerant liquid, which is to be sucked into the pump, to flow into the evaporator, because the refrigerator which is provided with the fixed throttle mechanism such as the orifice has no mechanism of decreasing the amount of the refrigerant liquid flowing into the evaporator.

The amount of the refrigerant liquid circulated through the motor cooling cycle is thus reduced and the effective suction pressure of the pump is lowered, to cause the cavitation. As the result, the flow amount of the refrigerant liquid is decreased remarkably and the motor temperature is raised.

In order to prevent such cavitation, it is necessary that the required forcing pressure or net positive suction head (NPSH) of the refrigerant pump is increased, or that the positional difference in vertical direction between the refrigerant liquid discharge port of the condenser and the refrigerant liquid suction port of the refrigerant pump is made substantially large. This, however, causes the condenser to be located at an elevated position and the refrigerator must be large-sized accordingly.

It would therefore be desirable to provide a motor cooling apparatus for the refrigerator capable of reducing the saturated vapor pressure of refrigerant liquid at the suction port of the refrigerant pump, which serves to feed the refrigerant liquid through the motor cooling cycle, so as to prevent the cavitation of the refrigerant pump

SUMMARY OF THE INVENTION

The present invention is intended to eliminate the above-mentioned drawbacks.

An object of the present invention is therefore to provide a motor cooling apparatus for the refrigerator capable of holding the amount of refrigerant liquid, which is circulated through a motor cooling cycle, sufficient to smoothly render the refrigerant pump operative.

Another object of the present invention is to provide a motor cooling apparatus for the refrigerator capable of decreasing the required forcing pressure or net positive suction head of the refrigerant pump to make the refrigerator small-sized as well as to prevent cavitation.

A further object of the present invention is to provide a motor cooling apparatus for the refrigerator which is highly reliable in operation.

According to an aspect of the present invention, there is provided a motor cooling apparatus for the refrigerator which includes an evaporator, a condenser, a compressor and a main motor arranged to actuate the compressor and connected to the condenser at the internal space thereof including a passage for guiding refrigerant liquid condensed in the condenser to the internal space of the main motor by means of a refrigerant pump connected thereto; a first opening formed in the condenser and connected to the internal space of the main motor; a second opening formed in the bottom of the condenser and connected to the evaporator; a reservoir formed on the bottom side of the condenser to stock the refrigerant liquid, and preferential flow means for causing liquid refrigerant to preferentially flow into the reservoir, the preferential flow means comprising said reservoir being located between the first and second openings in the longitudinal direction of the condenser and connected to the passage means on the suction side of the refrigerant pump.

The motor cooling apparatus according to this aspect of the present invention preferably further includes a chiller connected to the passage means on the suction side of the refrigerant pump to cool the refrigerant liquid and comprising a part of the internal space of the evaporator and that portion of the passage means which is inserted into the internal space of the evaporator.

The motor cooling apparatus according to this aspect of the present invention may further include a chiller connected to the passage means on the suction side of the refrigerant pump to cool the refrigerant liquid fed to the pump and provided with a cooling water passage connected parallel to the cooling water passage of the condenser.

According to another aspect of the present invention, there is provided a motor cooling apparatus for the refrigerator which includes an evaporator, a condenser, a compressor and a main motor arranged to actuate the compressor and connected to the condenser at the internal space thereof comprising a passage means for guiding refrigerant liquid condensed in the condenser to the internal space of the main motor by means of a refrigerant pump connected thereto; a reservoir formed at the bottom side of the condenser to stock the refrigerant liquid and connected to the passage on the suction side of the refrigerant pump; a throttle formed at the bottom of the reservoir to control the amount of the refrigerant liquid flowing to the evaporator; and preferential flow means for causing the liquid refrigerant in the reservoir to preferentially flow into the passage means, the preferential flow means comprising a dam formed inside the reservoir, enclosing the throttle, and serving to prevent the refrigerant liquid, which has flowed into the reservoir, from flowing directly to the throttle.

DETAILED DESCRIPTION OF THE PREFERRED EMBODIMENT

Some examples of the motor cooling apparatus for the refrigerator according to the present invention will be described with reference to the accompanying drawings.

Figure 1:
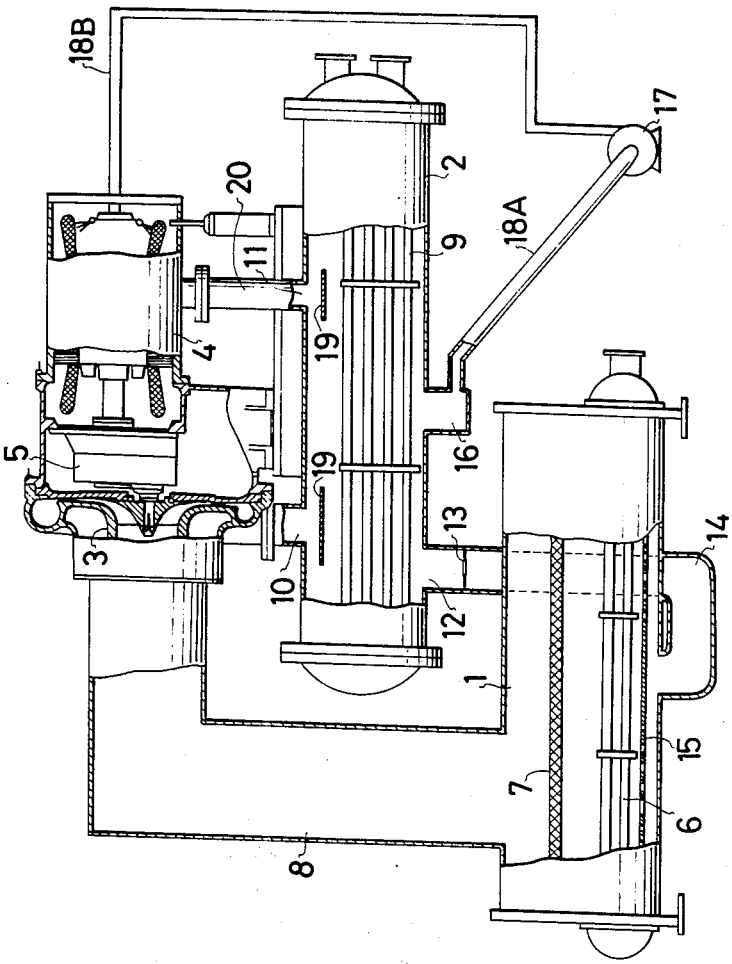
FIG. 1 is a front view, partly sectioned, showing an example of the motor cooling apparatus for the refrigerator according to the present invention.

FIG. 1 illustrates an example of the motor cooling apparatus for the refrigerator according to the present invention. The refrigerator with which the motor cooling apparatus is used includes an evaporator 1, a condenser 2, a compressor 3 and a main motor 4. The main motor 4 serves to actuate the compressor 3 through a speed change gear 5. The evaporator 1 has a heat exchanger tube 6 and an eliminator 7, and it is communicated with the compressor 3 through the eliminator 7 and a suction pipe 8. A heat exchanger tube 9 is housed in the condenser 2. The condenser 2 is connected to the discharge port of the compressor 3 at a connection port 10 thereof and also connected to the internal space of the main motor through a communication passage 20 at another connection port 11 thereof.

The condenser 2 is also connected to the bottom of the evaporator 1 through an appropriate throttle means 13 such as an orifice or manual valve, and through a connection passage 14 at a further connection port 12 thereof, and it is further communicated with the interior of the evaporator 1 through a refrigerant distribution plate 15. The connection port 12 is formed at the bottom of the condenser 2. The condenser 2 has a reservoir 16 formed at the bottom thereof to stock the refrigerant liquid, and this reservoir 16 is located between the connection ports 11 and 12 in the longitudinal direction of the condenser 2, to define preferential flow means.

This example of the motor cooling apparatus includes a first refrigerant liquid guide passage 18A connected to the reservoir 16 at one end thereof, a refrigerant pump 17 connected to the other end of the first guide passage 18A at the suction port thereof, and a second refrigerant liquid guide passage 18B connected to the discharge port of the pump 17 at one end thereof and to the main motor 4 at the other end thereof. The first and second guide passages 18A and 18B serve to guide the refrigerant liquid condensed in the condenser 2 to the inside of the main motor 4 by means of the refrigerant pump 17. Numeral 19 in FIG. 1 represents baffle plates formed in the condenser 2 adjacent to the connection openings 10 and 11 through which the condenser 2 is connected to the compressor 3 and main motor 4, respectively.

Refrigerant evaporated in the evaporator 1 is sucked into the compressor 3 through the eliminator 7 and suction pipe 8 and compressed therein. The refrigerant thus compressed is fed to the condenser 2 through the connection port 10 and condensed therein. The refrigerant liquid thus condensed is returned from the condenser to the evaporator through the connection port 12, throttle means 13 and connection passage 14. A refrigeration cycle is thus formed. As described above, the refrigerant flowing through the refrigeration cycle is joined in the condenser 2 with refrigerant flowing through another motor cooling cycle.

The reservoir 16 is located between the connection port 12, through which the condenser 2 is connected to the evaporator 1, and the connection port 11, through which the condenser 2 is connected to the main motor 4 via a communication passage 20, when viewed in the longitudinal direction of the condenser 2. That part of the refrigerant flowing through the motor cooling cycle which is not evaporated in the main motor 4 but returned to the condenser 2 via the communication passage 20 and connection port 11 is stocked in the reservoir 16, flows on the bottom of the condenser 2 together with a part of the refrigerant liquid condensed in the condenser 2, and is sucked into the refrigerant pump 17 through the guide passage 18A. Even in a case where the load applied to the refrigerator is small and the amount of the refrigerant flowing through the refrigeration cycle is also small, therefore, the amount of the refrigerant flowing through the motor cooling cycle can be adequate.

When the load applied to the refrigerator is large enough, the amount of the refrigerant discharged from the compressor 3 and condensed in the condenser 2 becomes larger than the amount of the refrigerant flowing through the motor cooling cycle. In addition, an amount of the refrigerant liquid larger than that sucked into the refrigerant pump 17 is usually supplied to the reservoir 16, overflowing the latter, and the excessive refrigerant flows in the direction of the connection port 12 through which the condenser 2 is connected to the evaporator 1. Therefore, the motor cooling cycle can be held smoothly operated, similarly to the case where the load applied to the refrigerator is partial.

Figure 2:
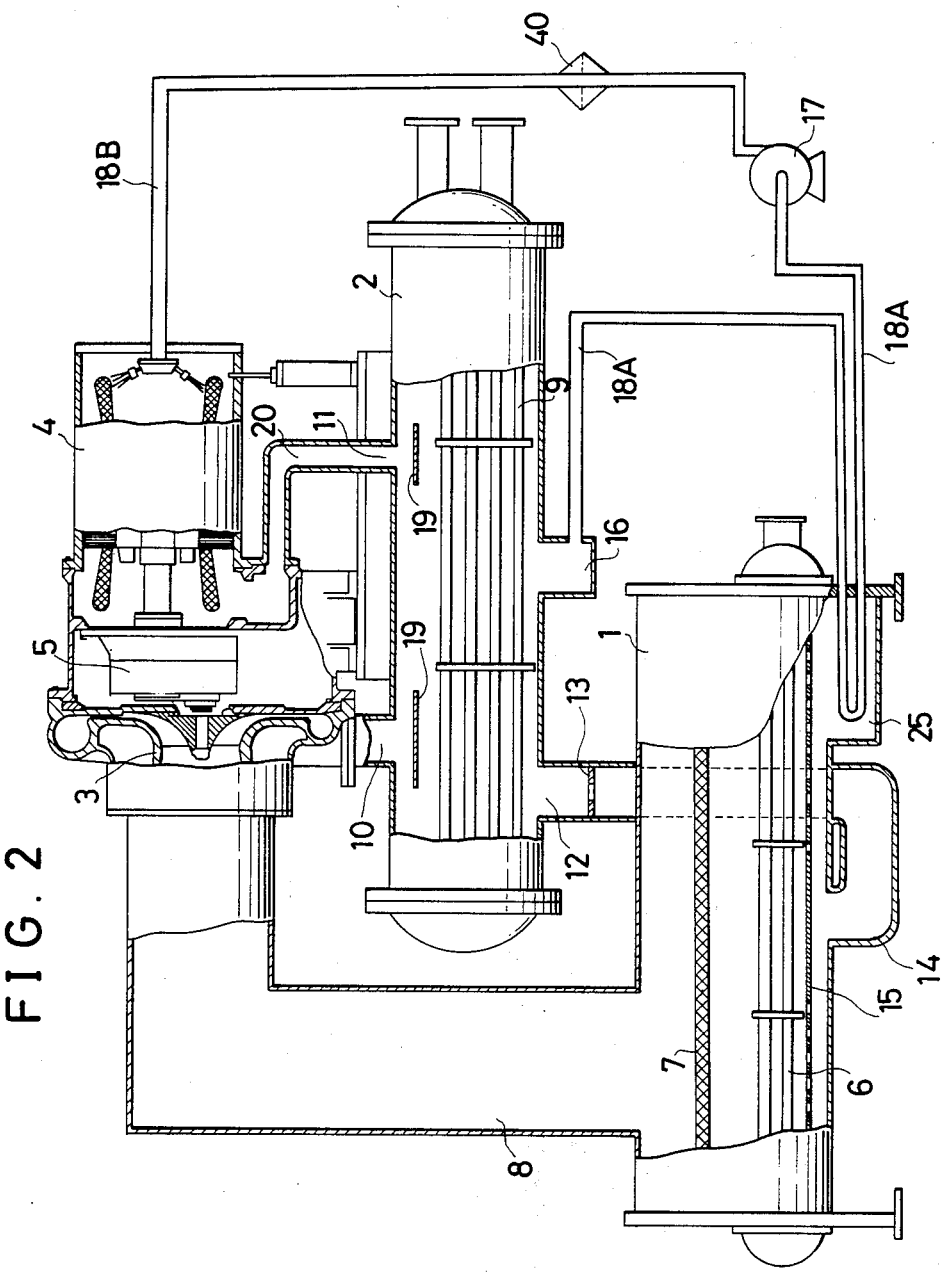
FIG. 2 is a front view, partly sectioned, showing another example of the motor cooling apparatus for the refrigerator according to the present invention.

FIG. 2 shows another example of the motor cooling apparatus for the refrigerator according to the present invention. The motor cooling apparatus shown in FIG. 2 is intended to use the internal space of the evaporator.

In the case of this motor cooling apparatus, a part of the first guide passage 18A arranged on the suction side of the refrigerant pump 17 is inserted into a lower portion 25 of the evaporator 1 to cool refrigerant liquid passing through the first guide passage 18A by refrigerant evaporated in the evaporator 1. The refrigerant liquid which is to be cooled is discharged from the reservoir 16 to the first guide passage 18A by means of the refrigerant pump 17. The refrigerant liquid is then guided into the internal space of the evaporator 1 through the first guide passage 18A and supercooled by the refrigerant evaporated in the evaporator 1. The refrigerant liquid thus cooled is sucked into the refrigerant pump 17. Therefore, the saturated vapor pressure of the refrigerant liquid is decreased at the suction port of the refrigerant pump 17, thereby making the refrigerant liquid hard to flush, so that the cavitation of the refrigerant pump can be restrained substantially. This enables the required forcing pressure or net positive suction head (NPSH) of the refrigerant pump to substantially be reduced, thereby making it unnecessary to arrange the condenser 2 at an elevated position.

In the case of the motor cooling apparatus shown in FIG. 2, the refrigerant evaporated in the evaporator 1 is used as low temperature fluid for cooling the refrigerant liquid. However, the refrigerant is not limited to being used as such fluid so far as it can decrease the saturated vapor pressure of the refrigerant liquid. Any refrigerant which evaporates under a pressure smaller than the pressure of the condenser 2 can be used to effectively decrease the saturated vapor pressure of the refrigerant liquid. In the case of the refrigerator which employs a multistage compressor, for example, refrigerant which evaporates under the pressure of an econimizer may be used, whereas in the case of the refrigerator which employs a single-stage compressor, refrigerant which evaporates in a vessel communicated with the intermediate portion of the compressor (i.e. the inlet portion of a diffuser in the compressor) may be used.

Numeral 40 in FIG. 2 represents a strainer arranged on the way of the second refrigerant liquid guide passage 18B. Description on same elements as those in FIG. 1 is omitted.

Figure 3:
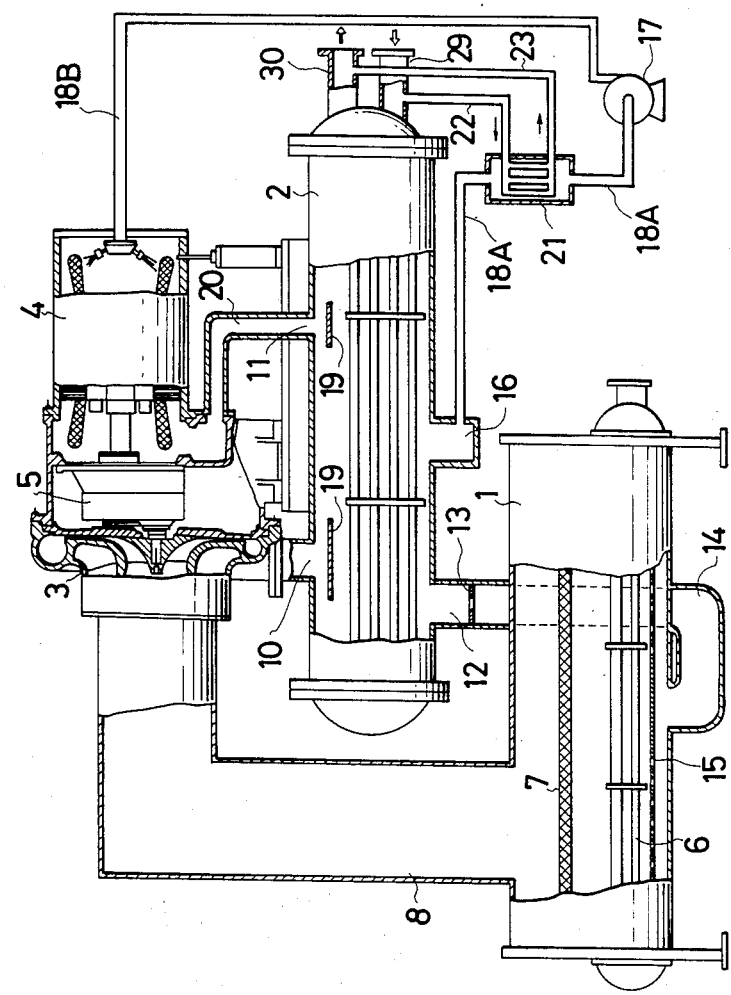
FIG. 3 is a front view, partly sectioned, showing a further example of the motor cooling apparatus for the refrigerator according to the present invention.

FIG. 3 shows a further example of the motor cooling apparatus for the refrigerator according to the present invention.

As shown in FIG. 3, the first guide passage 18A is provided with a chiller 21 arranged on the way to the refrigerant pump 17. The chiller 21 has a plurality of cooling water passages connected to a cooling water feed pipe 22 and a cooling water return pipe 23 which are connected in parallel to a cooling water inlet passage 29 and a cooling water outlet passage 30, respectively.

Description on same elements as those in FIG. 1 will be omitted.

A part of refrigerant liquid condensed in the condenser 2 is discharged from the reservoir 16 to the first guide passage 18A and when it reaches the chiller 21, the refrigerant liquid is cooled due to the heat exchange between the refrigerant liquid and a part of cooling water in the condenser which is fed to the chiller 21 through the cooling water feed pipe 22. The refrigerant liquid thus cooled is increased in pressure by the refrigerant pump 17 and fed to the main motor 4 through the second guide passage 18B, so that the refrigerant liquid can remove heat from the main motor 4 whose temperature is so high as to evaporate the refrigerant liquid. The refrigerant is then returned to the condenser 2 through the communication passage 20. The motor cooling cycle is thus formed.

The chiller 21 is on the way of the first refrigerant liquid guide passage 18A located on the suction side of the refrigerant pump 17 and the cooling water passages in the chiller 21 are connected to the cooling water passages 29 and 30 of the condenser 2 through the parallel cooling water pipes 22 and 23, so that a part of water which has inlet temperature can be fed, as low temperature fluid, from the cooling water inlet passage 29 to the chiller 21 through the cooling water feed pipe 22. On the other hand, the refrigerant liquid which is high in temperature has, at the outlet of the condenser 2, a temperature higher by about 2° to 5° C. than the cooling water which has outlet temperature. Therefore, the refrigerant liquid discharges heat to the cooling water in the chiller 21 to become supercooled. The cooling water which has removed heat from the refrigerant liquid is returned to the cooling water outlet passage 30 through the cooling water return pipe 23.

The refrigerant liquid at the suction port of the refrigerant pump 17 has been supercooled in such a manner as described above and its saturated vapor pressure can thus be decreased to make it hard to flush, thereby preventing the cavitation of the refrigerant pump 17. This enables the required forcing pressure or net positive suction head of the refrigerant pump 17 to be decreased accordingly, thereby making it unnecessary to locate the condenser 2 at an elevated position.

Figure 4:
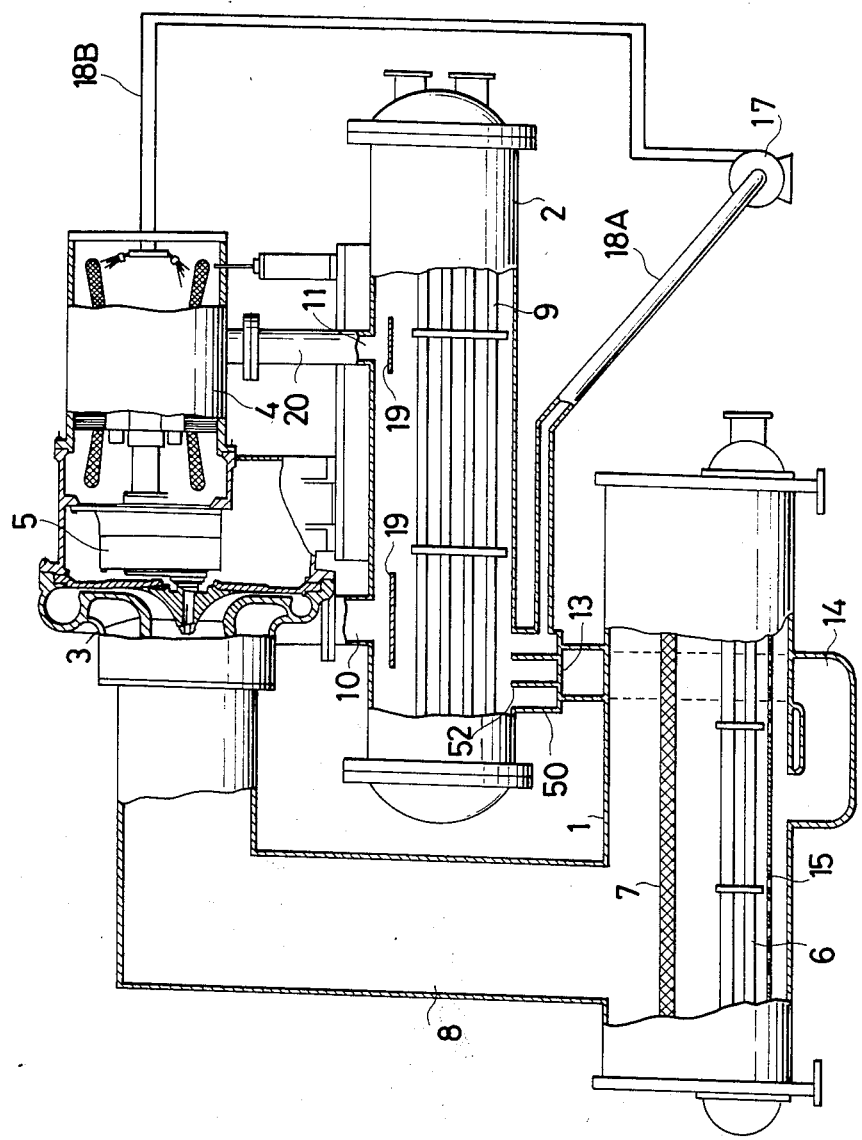
FIG. 4 is a front view, partly sectioned, showing a still further example of the motor cooling apparatus for the refrigerator according to the present invention.

FIG. 4 shows a still further example of the motor cooling apparatus for the refrigerator according to the present invention.

In FIG. 4, numeral 50 represents a reservoir formed at the bottom of the condenser 2 and this reservoir 50 is connected to the first guide passage 18A. The throttle means such as the orifice is formed at the bottom of the reservoir 50. Numeral 52 represents a dam or partition wall erected on the bottom of the reservoir 50, enclosing the throttle means 13 to define preferential flow means. Description on same elements as those in FIG. 1 will be omitted.

Since the throttle means 13 is enclosed by the dam 52 in the reservoir 50, the refrigerant liquid flowing in the condenser 2 first reaches a position outside the dam 52. It is then sucked into the refrigerant pump 17 through the first guide passage 18A and fed to the main motor 4 through the second guide passage 18B. Since the amount of the refrigerant liquid which can be sucked into the refrigerant pump 17 is limited, however, the most of the refrigerant liquid overflows the dam 52 into the throttle means 13 which is communicated with the evaporator 1, and further into the evaporator 1 through the communication passage 14.

Independent of the condition under which the refrigerator is operated, the refrigerant liquid in the condenser 2 is first maintained outside the dam 52 in the reservoir 50 without flowing directly into the throttle means 13, and it is then sucked into the refrigerant pump 17 through the guide passage 18A. Therefore, the amount of the refrigerant flowing through the motor cooling cycle can be guaranteed, while the motor cooling cycle can be held smoothly operated.

When the dam 52 is made as high as possible to prevent the cavitation and obtain the forcing pressure necessary to force the refrigerant liquid into the suction port of the refrigerant pump 17, the motor cooling cycle can be held more smoothly operated.

According to the motor cooling apparatus of the present invention as described above, the amount of the refrigerant liquid which is needed for the motor cooling cycle can be held sufficient and the refrigerant pump which supplies the refrigerant liquid to the main motor can be smoothly operated. In addition, the motor cooling apparatus is intended to connect the internal space of the main motor to the condenser and employ the motor cooling cycle for introducing the refrigerant liquid of the condenser into the internal space of the main motor, so that the refrigerant liquid can be supercooled to decrease the saturated vapor pressure of the refrigerant liquid at the suction port of the refrigerant pump, thereby preventing the cavitation of the refrigerant pump and reducing the vertical positional difference between the refrigerant liquid discharge port of the condenser and the suction port of the refrigerant pump. Therefore, the motor cooling apparatus has high reliability and enables the refrigerator to be made small and compact.

We claim:

1. A motor cooling apparatus for the refrigerator which includes an evaporator, a condenser, a compressor and a main motor adapted to actuate the compressor and connected to the condenser at the internal space thereof, comprising:
    a passage means for guiding refrigerant liquid condensed in the condenser to the internal space of the main motor by means of a refrigerant pump;
    a first opening formed in the condenser and connected to the internal space of the main motor;
    a second opening formed at the bottom of the condenser and connected to the evaporator;
    a reservoir formed at the bottom of the condenser to stock the refrigerant liquid; and
    preferential flow means for causing said liquid refrigerant to preferentially flow into said reservoir, such preferential flow means comprising said reservoir being located between the first and second openings in the longitudinal direction of the condenser and connected to the passage means on the suction side of the refrigerant pump, whereby refrigerant liquid from said first opening preferentially flows into said reservoir.

2. A motor cooling apparatus as defined in claim 1 further comprising a chiller connected to the passage means on the suction side of the refrigerant pump to cool the refrigerant liquid, said chiller including a part of the internal space of the evaporator and that part of the passage means which is inserted into said part of the internal space of the evaporator.

3. A motor cooling apparatus as defined in claim 2 further comprising a throttle means for controlling the flow amount of the refrigerant liquid flowing from the condenser to the evaporator.

4. A motor cooling apparatus as defined in claim 3 wherein the throttle means includes an orifice.

5. A motor cooling apparatus as defined in claim 1 further comprising a chiller connected to the passage means on the suction side of the refrigerant pump to cool the refrigerant liquid which is to be fed to the main motor, and said chiller having cooling water passage means connected in parallel to cooling water passage means of the condenser.

6. A motor cooling apparatus for use with the refrigerator which includes an evaporator, a condenser, a compressor and a main motor adapted to actuate the compressor and connected to the condenser at the internal space thereof, comprising:
    a passage means for guiding refrigerant liquid condensed in the condenser to the internal space of the main motor by means of a refrigerant pump;
    a reservoir formed at the bottom of the condenser to stock the refrigerant liquid and connected to the passage means on the suction side of the refrigerant pump;
    throttle means formed at the bottom of the reservoir for controlling the amount of the refrigerant liquid flowing from the condenser to the evaporator; and
    preferential flow means for causing said liquid refrigerant in said reservoir to preferentially flow to said passage means, said preferential flow means comprising a dam, formed in the reservoir and enclosing the throttle means, to prevent the refrigerant liquid which has flowed into the reservoir from flowing directly to the throttle means, wherein connection of said passage means to said reservoir is outside of said dam means.

7. A motor cooling apparatus as defined in claim 6 wherein the throttle means includes an orifice.

* * * * *